United States Patent Office 3,152,171
Patented Oct. 6, 1964

3,152,171
METHOD FOR THE PREPARATION OF
α-FLUOROACRYLONITRILE
Harry J. Cenci, Warminster, Warren D. Niederhauser, Meadowbrook, and Peter L. de Benneville, Philadelphia, Pa., assignors to Rohm & Haas Company, Philadelphia, Pa., a corporation of Delaware
No Drawing. Filed Aug. 24, 1962, Ser. No. 219,133
5 Claims. (Cl. 260—465.7)

This invention deals with a method for the preparation of α-fluoroacrylonitrile by reacting ethylene with 1,2-difluoro-1,2-dicyanoethylene.

The present reaction may be conducted on either a batch or continuous basis. On a continuous basis there is used a temperature in the range of about 400° to 800° C., preferably 500° to 700° C. If the continuous adaptation is contemplated a wide range of contact times can be employed. Depending on the ratio of the reactants, residence times such as from 1 to 200 seconds, may be used. If a batch adaptation is contemplated temperatures in the range of about 230° to 360° C. can be employed, preferably 280° to 320° C.

The reactants combine on an equimolecular basis. The reactants may be present in the reaction medium in a wire range of molar ratios which do not appear to be particularly critical. Ratios of 0.2 to 1.0 moles of the 1,2-difluoro-1,2-dicyanoethylene for each 0.1 to 1.0 mole of ethylene are quite satisfactory for the present purposes.

The present reaction is satisfactorily consummated at atmospheric pressure but can be readily performed at subatmospheric or superatmospheric pressures. If the batch procedure is desired, it is preferred to use superatmospheric pressures. The pressures generated autonomously at the defined reaction temperatures are quite satisfactory. Pressures of 6,000 to 7,000 pounds per square inch are frequently obtained and pressures up to about 10,000 pounds per square inch and more are useful. In a continuous adaptation of the present process it is often advantageous to use reduced pressures, such as down to about 200 mm. of mercury and lower, as desired. The α-fluoroacrylonitrile formed is readily isolated by conventional techniques such as by distillation to give a product that is useful in the formation of homopolymers and copolymers. Copolymers with methyl methacrylate are particularly useful in that a tough yet flexible film is produced.

As a rule, the polymerization characteristics are most favorable in conjunction with comonomers which contain highly polar substitutents, such as nitrile and ester. Therefore the acrylic monomers, such as methyl acrylate, ethyl acrylate, methyl methacrylate, acrylonitrile and acrylamide, and the disubstituted monomers such as dimethyl fumarate, diethyl fumarate, dibutyl fumarate and dimethyl itaconate are preferred as comonomers. However, many other types of ethylene comonomers can be used to give a broad range of useful products.

The homopolymers and copolymers of α-fluoroacrylonitrile are useful as bulk plastics, solution coatings, emulsion coatings and fibers, to which they lend improved high temperature performance, water and soap resistance, resistance to dirt and grime and better blending characteristics with inorganic pigments. Copolymers may be heated to the softening point without the darkening which is characteristic of other nitrogenous monomers, such as acrylonitrile itself. They may be incorporated into copolymer blends for use in improving the characteristics of lubricating oil.

α-Fluoroacrylonitrile is known to be an effective seed fumigant.

The 1,2-difluoro-1,2-dicyanoethylene reactant is obtained by reacting 1,2-dichloro-1,2-dicyanoethylene with an alkali metal fluoride at 160° to 200° C. in an inert polar solvent.

The present invention may be more fully understood from the following examples which are offered by way of illustration and not by way of limitation. Parts by weight are used throughout.

*Example 1*

A 30 inch stainless steel tube (⅞ inches inside diameter) equipped with a ¼ inch (outside diameter) stainless steel tube (in which thermocouple is placed) is packed with 79 parts of stainless steel Cannon packing. A 12 inch portion of this tube is heated to 640° to 655° C. with an electric furnace and a mixture of 68.4 parts (0.60 mole) of 1,2-difluoro-1,2-dicyanoethylene and 13.7 parts (0.49 mole) of ethylene is passed through the heated tube over a 6 hour period. The exit gases are condensed in a trap cooled in a Dry Ice-acetone bath and consist of 65 parts of a brown liquid. Vapor phase chromatograph of the reaction mixture indicated that it contains 15.2% of α-fluoroacrylonitrile and 78.3% of 1,2-difluoro-1,2-dicyanoethylene. This corresponds to a 46% yield of α-fluoroacrylonitrile. α-Fluoroacrylonitrile is isolated from this mixture by distillation.

α-Fluoroacrylonitrile boils at 34.5–34.8° C. The product contains 50.83% carbon (50.71% theoretical), 3.13% hydrogen (2.84% theoretical), 18.46% nitrogen (19.72% theoretical) and 26.62% fluorine (26.74% theoretical).

*Example 2*

Into a 110 ml. Aminco autoclave there is charged 34.2 parts (0.30 mole) of 1,2-difluoro-1,2-dicyanoethylene. The autoclave is sealed and flushed with ethylene and then it is charged with 16.2 parts of (0.58 mole) of ethylene. The autoclave is placed in a rocker behind a barricade and heated to 300° over a period of 2 hours 13 minutes. It is then kept at 300° to 337° C. for 31 minutes. The autoclave is vented at 323° C. into two traps connected in series and cooled in a Dry Ice-acetone bath. The liquid collected in the traps weighs 25.3 parts and vapor phase chromatography indicated that it contained 25.8% of α-fluoroacrylonitrile and 68% of 1,2-difluoro-1,2-dicyanoethylene. This represents a 30.9% yield (15.3% conversion) of α-fluoroacrylonitrile.

*Example 3*

Into a polymer tube is charged 0.054 part of azodiisobutyronitrile and 57 parts of α-fluoroacrylonitrile. The tube is connected to a vacuum line, and after the mixture is thoroughly degassed, the tube is sealed under vacuum. It is heated in an oil bath at 60° C. Polymer begins to precipitate after two hours. After 48 hours, the tube is cooled and opened. There are recovered 31 parts of white, solid polymer and 26 parts of unpolymerized α-fluoroacrylonitrile. Poly(α-fluoroacrylonitrile) requires percent C, 50.71; percent H, 3.13; percent N, 19.72; percent F, 26.74. A polymer prepared in this way gave percent C, 50.76; percent H, 3.13; percent N, 19.37; percent F, 26.74.

Poly(α-fluoroacrylonitrile) has valuable properties which are not shared by the unsubstituted material. It is for example, surprisingly soluble in acetone. The use of this cheap, easily recoverable solvent greatly simplifies the problem of spinning fibers from the homopolymer, or from copolymers which contain a major proportion of this monomer. Such fibers have improved thermal and chemical stability, flame resistance and are particularly resistant to oxidative degradation. Molded articles may be prepared from poly(α-fluoroacrylonitrile) without the usual darkening and decomposition noted with poly(acrylonitrile) and other substituted poly(acrylonitriles) at elevated temperatures.

Example 4

Into approximately a 25 ml. test tube constricted near the top and having a ground glass joint there is charged 2.0 parts of α-fluoroacrylonitrile, 8.0 parts of methyl methacrylate and 0.0061 part of azodiisobutyronitrile. The tube is attached to a vacuum line and after being thoroughly degassed it is sealed under vacuum. The sealed tube is placed in an oil bath at 60°. After 16 hours the material in the tube had polymerized to a transparent solid. The tube is allowed to remain in the oil bath at 60° for six days and then the tube is broken. The transparent solid has the following elemental analysis. 58.37% carbon, 7.00% hydrogen, 4.04% nitrogen, and 6.78% fluorine. The polymer has a reduced specific viscosity in ethylene dichloride at 30° C. of 0.28 liter/gram. The polymer is tough and has significantly less water absorption than methyl methacrylate homopolymers.

We claim:

1. A method for the preparation of α-fluoroacrylonitrile which comprises reacting ethylene with 1,2-difluoro-1,2-dicyanoethylene, with the proviso that when said method is continuous, the reaction temperature is about 400° to 800° C. and when said method is batch, the reaction temperature is about 230° to 360° C.

2. A continuous method for the preparation of α-fluoroacrylonitrile which comprises reacting ethylene with 1,2-difluoro-1,2-dicyanoethylene in a temperature range of about 400° to 800° C.

3. A continuous method for the preparation of α-fluoroacrylonitrile which comprises reacting ethylene with 1,2-difluoro-1,2-dicyanoethylene in a temperature range of about 500° to 700° C. at pressures between about 200 mm. of mercury up to atmospheric.

4. A batch method for the preparation of α-fluoroacrylonitrile which comprises reacting ethylene with 1,2-difluoro-1,2-dicyanoethylene in a temperature range of about 230° to 360° C.

5. A batch method for the preparation of α-fluoroacrylonitrile which comprises reacting ethylene with 1,2-difluoro-1,2-dicyanoethylene in a temperature range of about 280° to 320° C. at pressures greater than atmospheric up to about 10,000 lbs./square inch.

No references cited.